United States Patent [19]

Yazawa et al.

[11] Patent Number: 4,543,301
[45] Date of Patent: Sep. 24, 1985

[54] MAGNETIC RECORDING MEDIUM

[75] Inventors: Kenji Yazawa; Kenichi Baba, both of Yokohama, Japan

[73] Assignee: Sony Corporation, Tokyo, Japan

[21] Appl. No.: 521,910

[22] Filed: Aug. 10, 1983

[30] Foreign Application Priority Data

Aug. 12, 1982 [JP] Japan .................................. 57-140248

[51] Int. Cl.⁴ .......................... G11B 5/66; B32B 15/04
[52] U.S. Cl. .................................... 428/621; 428/216; 428/336; 428/635; 428/642; 428/678; 428/668; 428/693; 428/694; 428/900; 427/131; 427/132
[58] Field of Search ............... 428/621, 642, 635, 900, 428/668, 678, 694

[56] References Cited

U.S. PATENT DOCUMENTS

| 3,350,180 | 10/1967 | Croll | 428/635 |
| 3,479,156 | 11/1969 | Ginder | 428/635 |
| 3,880,603 | 4/1975 | Whetstone | 428/621 |

FOREIGN PATENT DOCUMENTS 56-034142  4/1981  Japan .................................. 428/900

Primary Examiner—Veronica O'Keefe
Attorney, Agent, or Firm—Hill, Van Santen, Steadman & Simpson

[57] ABSTRACT

A magnetic recording medium having a non-magnetic substrate on which a first bismuth Bi under layer, a first magnetic metal layer, a compound layer made of the magnetic metal, a second bismuth Bi under layer and a second magnetic metal layer are sequentially formed in this order.

8 Claims, 5 Drawing Figures

MAGNETIC RECORDING MEDIUM

CROSS REFERENCE TO THE RELATED APPLICATION

The present invention is related to Yazawa copending application U.S. Ser. No. 367,949 filed Apr. 12, 1982 now abandoned, but (refiled as Ser. No. 540,707 on Oct. 11, 1983) and an improvement thereof.

BACKGROUND OF THE INVENTION

1. Field of the Invention

The present invention generally relates to a magnetic recording medium, and more particularly relates to a magnetic recording medium having a ferromagnetic metal thin film as a magnetic recording layer on a non-magnetic substrate.

2. Description of the Prior Art

A conventional magnetic recording medium is provided in such a manner that a magnetic paint composed mainly of an acicular ferromagnetic powder such as gamma-ferric oxide ($\gamma\text{-Fe}_2\text{O}_3$), chromium dioxide $CrO_2$, Fe-Co alloy powder or the like and a polymeric binder are coated on a non-magnetic substrate to form a magnetic recording layer.

Whereas, such a magnetic recording medium is worthwhile to be noticed in which a ferromagnetic metal thin film is formed on a non-magnetic substrate through the use of technique of vacuum evaporation, sputtering or ion plating and so on of ferromagnetic metal or alloy and this film is used as a magnetic recording layer. Since the magnetic recording medium of this ferromagnetic metal thin film type utilizes no binder, it can increase a packing density of magnetic material, and hence even if the magnetic recording layer is made thin, it is possible to obtain a magnetic recording medium having a high residual magnetic flux density. In addition, since the magnetic material layer thereof is formed as a thin layer, upon recording a short wavelength signal, it is also possible to provide a magnetic recording medium which is particularly excellent in sensitivity for such short wavelength signal and therefore it is quite desirable for high density magnetic recording.

As a method for forming a magnetic recording medium of such ferromagnetic metal thin film type, known in the prior art is a so-called oblique evaporation method. This is such a method in which vapor of ferromagnetic metal such as Fe and Co is obliquely incident on a non-magnetic substrate, thereby depositing and growing it on the non-magnetic substrate. In accordance with this oblique evaporation method, it is possible to obtain a magnetic recording medium having a high coercive force. But, to obtain a high coercive force, vapor particle beam of such as Fe and Co has to be incident on the non-magnetic substrate with an incident angle in a range from 40° to 80°, so that the deposition is poor in efficiency and hence productivity is low. But, unless the above oblique evaporation method is utilized, it is difficult to provide a magnetic recording medium having a high coercive force. Since, for example, cobalt has a high crystalline magnetic anisotropy, cobalt is appreciated as a magnetic material to provide a magnetic layer having a high coercive force. Nevertheless, if cobalt is merely evaporated, that is, a Co vapor beam is introduced to the major surface of a non-magnetic substrate substantially perpendicular so as to form a Co layer or film, the coercive force of that Co layer is less than 100 Oe. Thus such low coercive force as mentioned above is not suitable for use in the high density magnetic recording medium.

To form a magnetic material layer having a high coercive force independent of such above oblique evaporation method, there is proposed such a method that a magnetic metal layer is not directly formed on the non-magnetic substrate but instead, an under layer is formed between the non-magnetic substrate and the magnetic metal layer. As an example of the magnetic recording medium having an under layer such magnetic recording medium is known in which an under layer is formed by evaporating chromium as an under layer and cobalt is deposited on the under layer by the evaporation thereof. But, the magnetic characteristic of the magnetic recording medium thus constructed is apt to be influenced by a substrate temperature at which the magnetic metal layer is evaporated. For example, if a coercive force greater than 400 Oe is presented by utilizing cobalt having a thickness of 400 Å as an upper layer, it is necessary to heat a substrate up to 300° C. Accordingly, when a magnetic material layer having a coercive force more than 400 Oe is formed on a non-magnetic substrate, it was difficult to use a polymeric film such as polyethylene-telephthalate having poor heat resistance property as the non-magnetic substrate.

OBJECTS AND SUMMARY OF THE INVENTION

It is an object of the present invention to provide an improved magnetic recording medium having a magnetic recording layer formed of a ferromagnetic metal thin film.

It is another object of the present invention to provide a magnetic recording medium having a high coercive force.

It is a further object of the present invention to provide a magnetic recording medium having isotropic magnetic characteristics in a plane of a magnetic recording layer.

It is a still further object of the present invention to provide a magnetic recording medium having a plurality of magnetic layers having a high coercive force.

According to one aspect of the present invention, there is provided a magnetic recording medium comprising:

a non-magnetic substrate;

a first bismuth under layer formed on said non-magnetic substrate;

a first magnetic metal layer formed on said first bismuth under layer;

a compound layer formed on a surface portion of said magnetic metal layer which is made from said magnetic metal;

a second bismuth under layer formed on said compound layer; and a second magnetic metal layer formed on said second bismuth under layer.

The other objects, features and advantages of the present invention will become apparent from the following description taken in conjunction with the accompanying drawings through which the like references designate the same elements and parts.

DESCRIPTION OF THE PREFERRED EMBODIMENT

We have previously proposed a magnetic recording medium in which on a non-magnetic substrate discontinuously evaporated is bismuth Bi and then a magnetic metal layer made of, for example, cobalt Co is evaporated thereon, thus providing a magnetic layer of a high coercive force.

Further, as a magnetic recording medium in which a magnetic metal layer of high coercive force can be formed independent on the kinds of the substrate material, we have also previously proposed a magnetic recording medium in which an amorphous continuous film made of silicon, Si or silicon compound is formed on the non-magnetic substrate, bismuth Bi is evaporated thereon in a discontinuous island shape and a magnetic metal layer made of, for example, cobalt Co is deposited thereon by vacuum deposition.

Figure 1:
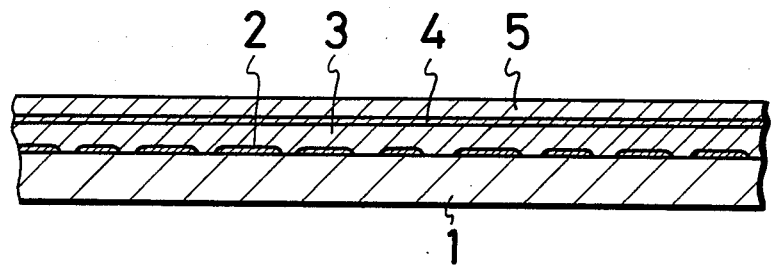
FIGS. 1 to 3 are respectively enlarged cross-sectional diagrams schematically showing magnetic recording media proposed in our copending application.

On the other hand, such a magnetic recording medium has been proposed that has a multilayer structure consisting of plural magnetic layers. When such a magnetic recording medium of multilayer structure consisting of plural magnetic layers is formed according to the above technique, it is proposed that, as, for example, shown in FIG. 1, bismuth Bi is deposited on a non-magnetic substrate 1 as a layer 2 and a first metal magnetic layer 3 made of cobalt Co or Co-Ni alloy is deposited thereon. A layer 4 made of bismuth Bi is similarly deposited on the first metal magnetic layer 3 and a second magnetic metal layer 5 made of cobalt Co, Co-Ni alloy or the like is formed thereon, thus providing a magnetic recording medium. The magnetic recording medium thus made, however, can not permit the second magnetic layer to have a high coercive force in practice. The reason for this may be considered as follows. Since the bismuth Bi layer 4 serving as the under layer of the second magnetic metal layer 5 has affinity for the first metal magnetic layer 3 below, upon deposition of the bismuth Bi, it is diffused into the metal magnetic layer 3 and hence the second magnetic metal layer 5 formed thereon can not present a high coercive force.

Figure 2:
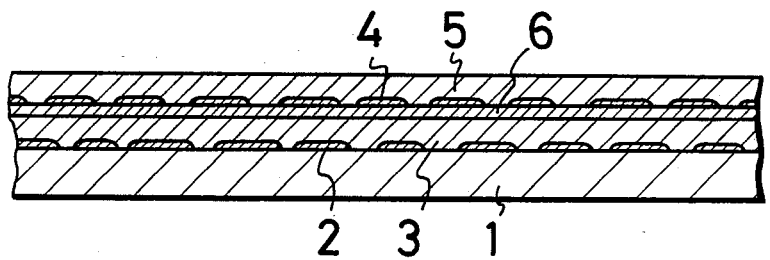

Meanwhile, as, for example, shown in FIG. 2, such a magnetic recording medium is known in which on the first metal magnetic layer 3 deposited is an intermediate layer 6 made of silicon Si or silicon compound and the bismuth Bi layer 4 is deposited thereon. In this case, since it is possible to prevent the bismuth Bi from being diffused into the under layer, when the second magnetic metal layer 5 is onto the bismuth Bi layer 4, the second metal magnetic layer 5 can reveal a high coercive force.

Figure 3:
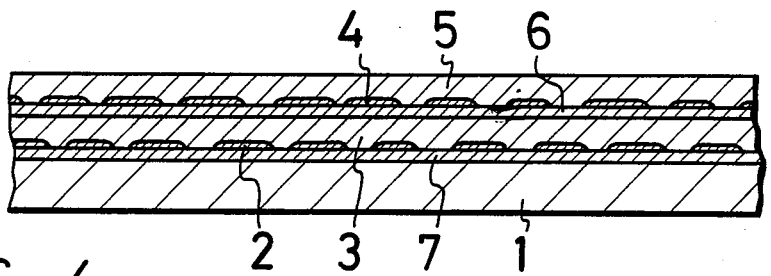

Furthermore, as shown in FIG. 3, other magnetic recording medium is known in which on the non-magnetic substrate 1 deposited is an under layer 7 made of silicon Si or silicon compound and then the bismuth Bi layer 2 is deposited thereon. This magnetic recording medium has an advantage that its dependency on the material of the non-magnetic substrate 1 can be removed and hence an inexpensive material such as polyethylene telephthalate film can be utilized as the non-magnetic substrate 1.

However, in the magnetic recording mediums as shown in FIGS. 2 and 3, the fact that the non-magnetic intermediate layer 6 is interposed between the first and second metal magnetic layers 3 and 5 causes a whole residual magnetic flux density Br to be lowered.

Figure 4:
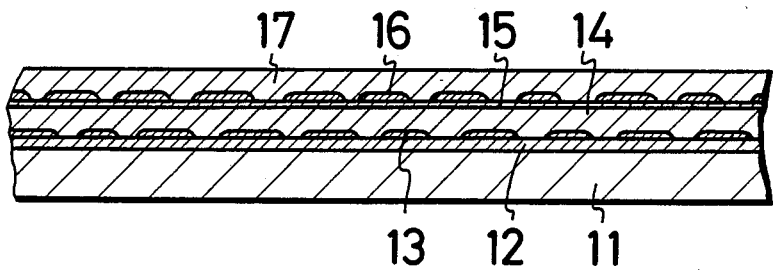
FIG. 4 is a schematically enlarged cross-sectional diagram showing an embodiment of a magnetic recording medium according to the present invention.

In accordance with the present invention, as shown in FIG. 4, a first non-magnetic metal layer 13 is deposited on a non-magnetic substrate 11 through or not through a continuous layer 12 made of silicon Si or silicon compound by, for example, vacuum deposition and a first magnetic layer 14 formed on a continuous magnetic metal layer is deposited on the first non-magnetic metal layer 13. This first magnetic metal layer 14 is formed according to other methods than the oblique evaporation method. In other words, the first magnetic metal layer 14 is deposited in such a manner that the vapor particles of magnetic metal may be incident on the substrate at substantially right angles.

Figure 5:
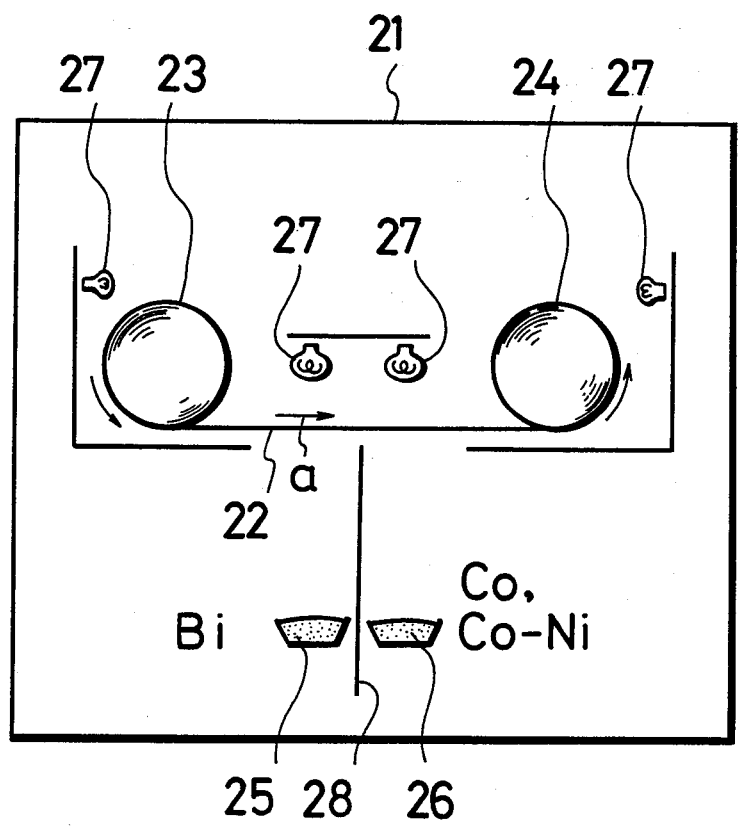
FIG. 5 is a schematic diagram of a vacuum deposition apparatus employed in the present invention.

FIG. 5 schematically illustrates an example of an vacuum deposition apparatus which is used in this invention for such purpose. As shown in FIG. 5, in a vacuum chamber 21, there are provided a supply reel 23 and a take-up reel 24 between which a non-magnetic substrate 22 is transported in the direction indicated by an arrow a. Reference numerals 25 and 26 designate sources for the material to be evaporated, that is, bismuth Bi as an under layer metal, magnetic metal Co or Co-Ni alloy and so on respectively. Reference numerals 27 designate heating lamps which are provided behind the non-magnetic substrate 22 to control the temperature thereof. A shield plate 28 is also provided between the evaporating sources 25 and 26.

Turning back to FIG. 4, the surface of the first magnetic layer 14 is subjected to oxidization treatment by which a compound of the first magnetic metal layer itself, for example, an oxide film layer 15 of extremely thin thickness is formed on the surface of the first magnetic layer 14. A second non-magnetic metal layer 16 made of the same material as that of the first non-magnetic metal layer 13 is deposited on the oxide film layer 15 by, for example, vacuum deposition and a second magnetic layer 17 made of, for example, the same continuous magnetic metal layer as that of the first magnetic metal layer 14 is deposited on the second non-magnetic metal layer 16.

The first and second non-magnetic metal layers 13 and 16 can be made of bismuth Bi, antimony Sb, thallium Tl or selenium Se, cadmium Cd, indium In, tin Sn, tellurium Te, lead Pb, polonium Po or alloy of them. It was confirmed that when particularly the bismuth Bi of these metal elements was used and then the magnetic metal layers 14 and 17 were respectively deposited thereon, the coercive force Hc thereof could be remarkably increased. Therefore, it is preferred that the non-magnetic metal layers 13 and 16 are made of bismuth Bi. Moreover, the film thickness of the non-magnetic metal layers 13 and 16 is selected such that the mean film thickness thereof is in a range from 10 to 1000 Å (1 $\mu g/cm^2$ to 100 $\mu g\ cm^2$) and more preferably in a range from 100 to 1000 Å.

The temperature of the substrate, namely, the temperature of the non-magnetic substrate 11 upon evaporation of the non-magnetic metal layers 13 and 16 is selected preferably higher than 2/3 of the melting point of the non-magnetic metal, for example, bismuth Bi expressed by absolute temperature but lower than the melting point. In this case, it is needless to say that the heat resisting property of the non-magnetic substrate 11 is taken into consideration.

Moreover, the first and second magnetic metal layers 14 and 17 are each preferably formed of an vacuum deposited film made of single metal cobalt Co or cobalt alloy such as Co-Ni alloy containing nickel Ni of less than 40 weight %. The film thickness thereof is selected in a range from 100 to 1000 Å and more preferably in a range from 250 to 500 Å. Because, it was confirmed that if the thickness of the magnetic layers 14 and 17 is too thin, they can not provide sufficient residual magnetic flux density Br, while if the thickness thereof is too thick, the magnetic layers 14 and 17 can not provide sufficient coercive force Hc and rectangular ratio Rs.

Furthermore, the compound layer 15 formed on the surface of the first magnetic layer 14. is preferably made of material which can lower the "wetting" or "affinity" to the second non-magnetic layer 16 and can form the compound layer 15 thin enough. Thus, it is preferable that the compound layer 15 is made of an oxide layer which is provided by oxidizing the surface itself of the first magnetic metal layer 14. The thickness of the oxide layer 15 is selected preferably in a range from 10 to 100 Å. Further, the compound layer 15 may be made of a nitride or carbide layer.

When this compound layer 15 is made of the oxide layer of the magnetic layer 14, after the deposition of the magnetic layer 14, an oxygen gas is introduced into the vacuum chamber and then the magnetic layer 14 is subjected to oxidization treatment in DC, AC or high frequency plasma which is generated by applying a certain voltage of DC, AC or high frequency between a pair of electrodes placed on both sides of a non-magnetic base, thus forming the compound layer 15. The thickness of the oxide layer can be selected by controlling the partial pressure of the supplied oxygen gas or intensity of the applied voltage, shape of electrodes used, distance between the electrodes, duration of time of applied electric field and so on.

The non-magnetic substrate 11 can be made of a polymer film such as, polyimide, polyethylene terephthalate and so on, ceramics, or glass, metal film having the surface oxidized or the like. The magnetic characteristic of the magnetic recording medium thus made is isotropic in its plane.

EXAMPLE 1

Bismuth Bi was deposited on the non-magnetic substrate 11 made of polyimide at the temperature of the substrate, namely, the temperature of the non-magnetic substrate 11 of 150° C. with a mean thickness of 50 Å and then an Ni-Co magnetic layer 14 containing 20 weight % of Ni was deposited in turn with the thickness of 300 Å. Then, $O_2$ gas was introduced into the vacuum chamber to make the pressure within the vacuum chamber as 0.06 Torr and then bombarding is carried out for one minute under the DC voltage of 1 kV and the current of 120 mA to thereby oxidize the surface of the magnetic layer 14.

Similarly, bismuth Bi was deposited with the mean film thickness of 50 Å on the above magnetic layer 14 at the temperature of 150° C. on the substrate 11 to form the second non-magnetic layer 16 and then Ni-Co alloy containing 20 weight % of Ni was deposited with the thickness of 300 Å, thus forming the second magnetic layer 17. Then, in the same way as in the above, $O_2$ gas was introduced into the vacuum chamber to make the pressure within the vacuum chamber as 0.06 Torr and then bombarding is carried out for one minute at DC 1 kV and DC 120 mA to form an oxide film on the surface of the magnetic layer 17.

The magnetic characteristics of the magnetic recording medium thus made were measured such that its coercive force Hc was 860 Oe, rectangular ratio Rs was 82.6 and magnetic flux density Br was 11,000 Gausses.

The thickness of the compound layer formed on the magnetic layer surface in the magnetic recording medium thus made was calculated as about 40 Å. This calculation was performed as follows. In order to check the film thickness of the oxide layer formed by the bombardment in the $O_2$ gas, the magnetization of the film formed without oxidation by the bombardment in the $O_2$ gaseous atmosphere but by sequentially evaporating bismuth Bi of 50 Å thick, Ni-Co alloy of 300 Å thick, bismuth Bi of 50 Å thick and Ni-Co alloy containing 20 weight % of Ni of 300 Å thick, was measured by a vibrating sample magnetometer (VSM) and the magnetization of the bombarded film was similarly measured so that the thickness of the oxide film was calculated from the decrease of the magnetization.

COMPARATIVE EXAMPLE 1

In the same way as in the example 1, silicon Si of 200 Å thick, bismuth Bi of 50 Å thick and Ni-Co containing 20 weight % of Ni of 300 Å thick were sequentially deposited on the non-magnetic substrate 11 made of polyimide at the temperature 150° C. of the substrate 11, and thereon silicon Si of 200 Å thick, bismuth Bi of 50 Å thick and Ni-Co containing 20 weight % of Ni of 300 Å thick were further deposited in turn, thus providing a magnetic recording medium. The magnetic characteristics of the magnetic recording medium thus made were measured such that its coercive force Hc was 890 Oe, rectangular ratio Rs was 81.5 and residual magnetic flux density Br was 7000 Gausses.

The residual magnetic flux density Br of the comparative example 1 is lowered as compared with that of the example 1. This is due to the existence of the non-magnetic silicon layer as the intermediate layer thereof in the comparison example.

According to the magnetic recording medium of the present invention, since the layer corresponding to the intermediate layer is formed of the compound layer 15 made of the oxide layer which is formed by oxidizing the surface of the first magnetic layer 14 itself, the thickness thereof can be reduced or made sufficiently thin with the result that the entire residual magnetic flux density of the magnetic recording medium can be improved.

Moreover, owing to the fact of the invention that the compound layer 15 is provided as the intermediate layer, the second non-magnetic layer 16 formed thereon can be prevented from being diffused into the under layer, thereby improving the coercive force of the second magnetic metal layer 17 formed thereon. Also, the coercive forces of the first and second magnetic layers 14 and 17 can be made equal to each other.

It is apparent that the present invention is not limited to the magnetic recording medium of multilayer structure having two magnetic layers formed of the first and second magnetic layers, but the present invention, when applied to a magnetic recording medium of multilayer structure of more than three layers having at least the first and second magnetic layers, can achieve the same effects.

Furthermore, the magnetic recording medium according to the present invention is not formed by the so-called oblique deposition method, but can present a high coercive force and the deposition efficiency of this invention is much better than that of the oblique evaporation method. Also, since the magnetic recording medium according to the present invention is not formed by the oblique evaporation, the medium thus made has isotropic magnetic characteristics in plane and is suitable for use as a disc medium and so on.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A magnetic recording medium comprising:
   a non-magnetic substrate;
   a first bismuth under layer formed on said non-magnetic substrate;
   a first magnetic metal layer formed on said first bismuth under layer;
   a compound layer composed of a compound of the metal of said first magnetic layer formed on a surface portion of said magnetic metal layer;
   a second bismuth under layer formed on said compound layer; and
   a second magnetic metal layer formed on said second bismuth under layer.

2. A magnetic recording medium according to claim 1, wherein said bismuth under layer has a thickness in a range from 10 to 1000 Å.

3. A magnetic recording medium according to claim 1, wherein said magnetic metal is cobalt or cobalt-nickel alloy.

4. A magnetic recording medium according to claim 1, wherein said magnetic metal layer has a thickness in a range from 100 to 1000 Å.

5. A magnetic recording medium according to claim 1 which further comprises an amorphous layer of silicon or silicon compound provided between said non-magnetic substrate and said first bismuth under layer.

6. A magnetic recording medium according to claim 1, wherein said bismuth under layer is formed as a discontinuous layer.

7. A magnetic recording medium according to claim 1, wherein said compound is an oxide of said magnetic metal.

8. A magnetic recording medium comprising:
   a non-magnetic substrate;
   a first bismuth under layer formed on said non-magnetic substrate;
   a first magnetic metal layer formed on said bismuth under layer by vapor deposition in which the angle of incidence of a vapor of said magnetic metal is substantially normal to a surface of said substrate;
   a compound layer composed of a compound of the metal of said first magnetic metal formed on a surface portion of said magnetic metal layer;
   a second bismuth under layer formed on said compound layer; and
   a second magnetic metal layer formed on said second bismuth under layer by vapor deposition in which the angle of incidence of a vapor of said magnetic metal is substantially normal to the surface of said substrate.

* * * * *